United States Patent [19]

Van Royen et al.

[11] Patent Number: 4,971,776
[45] Date of Patent: Nov. 20, 1990

[54] PROCESS FOR THE RECOVERY OF NO FROM THE WASTE GAS RESULTING FROM THE PRODUCTION OF AMMONIUM NITRITE

[75] Inventors: Luc Van Royen, Stabroek; Roland Putseys, Heide-Kalmthout; Willy Van Herck, Brasschaat; Domien Sluyts, Stabroek; Robert Pype, Ekeren, all of Belgium

[73] Assignee: Bayer Aktiengesellschaft, Leverkusen, Fed. Rep. of Germany

[21] Appl. No.: 398,105

[22] Filed: Aug. 24, 1989

Related U.S. Application Data

[63] Continuation of Ser. No. 192,428, May 10, 1988, abandoned.

[30] Foreign Application Priority Data

May 27, 1987 [DE]  Fed. Rep. of Germany ....... 3717835

[51] Int. Cl.$^5$ .................. C07B 17/16; C07B 31/20; C07B 21/00
[52] U.S. Cl. .................................. 423/232; 423/235
[58] Field of Search ................. 423/232, 234, 235

[56] References Cited

FOREIGN PATENT DOCUMENTS

0174907  3/1986  European Pat. Off. .
2015156 10/1971  Fed. Rep. of Germany .

OTHER PUBLICATIONS

Ullmanns Encyclopedia of Chemical Technology, no translation.

*Primary Examiner*—Robert L. Stoll
*Assistant Examiner*—Lori F. Coomo
*Attorney, Agent, or Firm*—Sprung Horn Kramer & Woods

[57] ABSTRACT

A process for the complete recovery of NO from the waste gas of ammonium nitrite production, in which gases containing nitrogen oxides are absorbed in a first stage in a solution of ammonium carbonate and/or ammonium bicarbonate to form ammonium nitrite solutions and the resulting waste gas containing carbon dioxide is absorbed in a second stage in an ammoniacal, aqueous solution to form ammonium carbonate and/or ammonium bicarbonate which is returned as such to the first absorption stage, and the waste gas containing carbon dioxide is brought into contact with a sulphuric acid of medium concentration containing from 0.1–5% by weight, preferably from 0.2 to 1.5% by weight of nitric acid before the carbon dioxide is introduced into the second absorption stage.

6 Claims, No Drawings

PROCESS FOR THE RECOVERY OF NO FROM THE WASTE GAS RESULTING FROM THE PRODUCTION OF AMMONIUM NITRITE

This is a continuation, of application Ser. No. 192,428, filed May 10, 1988, now abandoned.

The present invention relates to a process for the complete recovery of NO from the waste gas of ammonium nitrite production, in which the gases containing nitrogen oxides are absorbed in a first stage in a solution of ammonium carbonate and/or ammonium bicarbonate to form ammonium nitrite solutions and the resulting waste gas containing carbon dioxide is absorbed in a second stage in an ammoniacal solution to form ammonium carbonate and/or ammonium bicarbonate and is returned in this form to the first absorption stage.

It is known that the NO content in waste gases may be removed by means of suitable catalysts under simultaneous addition of ammonia. The waste gas is converted into nitrogen, the $NO_x$-content in the waste gas being thus converted into an inert substance.

During the production of hydroxylamine, by which nitrous gases from the combustion of ammonia are absorbed in an ammonium carbonate and/or ammonium bicarbonate solution in one or more serial-ordered absorption towers to form ammonium nitrite, a waste gas is produced containing both carbon dioxide and a residue of unabsorbed nitrogen oxides.

DE-A No. 2 015 156 describes a process for the recovery of this carbon dioxide content, in which the carbon dioxide is removed by absorption in an aqueous ammoniacal solution in an adjacent absorption tower to form an aqueous solution of ammoniumcarbonate and/or ammonium, bicarbonate. Subsequently this solution is returned to the absorption stage to form solutions containing ammonium nitrite, by which the cycle is completed.

The NO content in the waste gas containing carbon dioxide is not absorbed in the aqueous ammoniacal solutions and may therefore leave the adjacent absorption tower in its unchanged form.

EP No. 0 174 907 A2 discloses a process by which both oxides of nitrogen and sulphur dioxide may be removed from waste gases. In this process, a solution of nitric acid is added to the waste gas in a so called denitrating zone. The $NO/NO_2$ ratio is thereby adjusted in such a way that the formed dinitrogen trioxide can be concentrated very simply as nitrosyl sulphuric acid in several sulphuric acid absorption stages arranged in series. Diluted nitric acid and a sulphuric acid free from nitrogen oxides are obtained in a separate stage of the process by the addition of air at elevated temperatures, and these acids are then returned to the denitration zone and the sulphuric acid absorption stages. This process requires about 7 to 8 absorption towers for concentration of the dinitrogen trioxide as nitrosyl sulphuric acid and therefore involves considerable technical expenditure.

DD No. 212 495 A1 describes a process for the removal of nitrogen oxides from waste gases by successive washings with water and diluted nitric acid, combined with an absorption in concentrated sulphuric acid. In principle this process is similar to the one described above but the procedure is slightly modified.

Although substantial removal of $NO_x$ from waste gases may be achieved by the processes described above, they do not enable the $NO_x$ content in the waste gas to be directly utilized without the insertion of working-up stages to recover tri-, tetra- or penta-valent nitrogen oxides.

Thus, it is an object of the present invention to provide a process in which the disadvantages of the processes described above are not enclosed and which enables the NO-content to be recovered.

Surprisingly it has now been found that an almost quantitative recovery of the NO content from the production of ammonium nitrite simply may be achieved by bringing the waste gas containing NO into contact with a sulphuric acid solution containing nitric acid so that the chemical consistency of the newly formed waste gas is altered in such a manner that this waste gas can be utilized in the existing hydroxylamine installation without the insertion of working-up stages.

Thus, the present invention relates to a process for the complete recovery of NO from the waste gas of ammonium nitrite production, in which gases containing nitrogen oxides are absorbed in a first stage in a solution of ammonium carbonate and/or ammonium bicarbonate to form ammonium nitrite solutions and the resulting waste gas containing carbon dioxide is absorbed in a second stage in an ammoniacal, aqueous solution to form ammonium carbonate and/or ammonium bicarbonate which is returned as such to the first absorption stage, and the waste gas containing carbon dioxide is brought into contact with a sulphuric acid of medium concentration containing from 0.1-5% by weight, preferably from 0.2 to 1.5% by weight of nitric acid before the carbon dioxide is introduced into the second absorption stage.

In principle the contact of the $NO_x$ waste gas containing carbon dioxide with the sulphuric acid solution containing nitric acid only alters the chemical consistence of the nitrogen oxides in the waste gas.

It is therefore an important feature of the process according to this invention that even when the nitrogen oxide content has been changed, the carbon dioxide content in the waste gas may be worked up simultaneously with the NO-content and without the insertion of absorption and/or desorption stages. Thereby the existing principles of the ammonium nitrite production are not affected.

According to the invention, therefore, the carbon dioxide content is recovered as ammonium carbonate and/or bicarbonate and the $NO_x$ content is recovered as ammonium nitrite by the reaction between the trivalent nitrogen oxides formed and the above mentioned ammonium carbonate and/or bicarbonate solutions.

The sulphuric acid solution used according to this invention contains nitric acid as oxidising agent. The proportion of nitric acid in this solution may vary in particular from 0.1 to 5% by weight but will depend, of course, on the NO content of the waste gas. In practice, the proportion varies from 0.20 to 1.5% by weight.

Due to this low nitric acid content, the vapour pressure of nitric acid in the sulphuric acid solution can be kept very low so that the nitrate content in the freshly formed ammonium carbonate solution will be negligible. This is a precondition for an optimum recovery of the NO content as utilizable ammonium nitrite in accordance with the present invention.

The sulphuric acid concentrations of the solution put into this process may vary over a wide range, namely from 5 to 95% by weight $H_2SO_4$.

In practice, the concentration would vary from 30 to 70% by weight, preferably from 55 to 65% by weight.

In order to ensure a nearly complete recovery of the NO content from the waste gas, the sulphuric acid concentration should be adjusted in such a way that nitrogen oxides containing nitrogen in the third or fourth stage of oxidation are not absorbed.

In a preferred embodiment of the process with accordance to the invention, the medium concentrated sulphuric acid, will be at a temperature of from 25° to 80° C., preferably from 50° to 65° C.

According to the invention an adjustment of the temperature to these values provides a simple means by which the oxidized waste gas will be completely driven out of these solutions so that no trivalent and eventually tetravalent nitrogen oxides will remain in the medium concentrated sulphuric acid.

The oxidation of NO considerably lowers the concentration of sulphuric acid due to incorporation of water produced during the reaction. At the same time, the waste gas which is to be purified still contains a small quantity of water vapour depending on the temperature of the waste gas. Even this lowers the sulphuric acid concentration.

In view of these circumstances, it is an important advantage of this temperature control that it enables the sulphuric acid concentration to be adjusted to the desired values.

The elevated temperature controls the water balance in the solution and keeps the sulphuric acid concentration constant so that the above mentioned advantages are preserved.

If the sulphuric acid concentration rises not desired above the established value according to the invention it may be adjusted by the addition of water and/or a diluted nitric acid solution.

If the concentration falls below the established value, the appropriate amount of more highly concentrated sulphuric acid is added additionally.

In some cases, a precise control of the sulphuric acid concentration as well as the nitric acid concentration may be achieved by adding a diluted nitric acid solution.

On the whole, the combined addition of nitric acid and sulphuric acid has various advantages. The use of sulphuric acid as a circulating fluid prevents the increase of the nitric acid concentration during the oxidation of NO, with the result that the content of ammonium nitrate in the resulting ammonium carbonate solution containing ammonium nitrite can be kept very low.

Moreover, the described procedure makes it possible to keep the total quantity of nitric acid in the sulphuric solution very low so that an over-oxidation of NO to $NO_2$ does not occur.

The process according to the invention is described below by means of examples having no connections with each other.

EXAMPLE 1

A NO-containing waste gas resulting from the production of ammonium nitrate and having the analytical composition I is successively brought into contact with a sulphuric acid solution containing nitric acid and with an ammoniacal solution. The two solutions are kept in separate absorption towers. The freshly waste gas has the analytical composition II, corresponding to an efficiency-degree of 96.7%.

|  | Waste Gas I | Waste Gas II |
|---|---|---|
| NO Vol % | 0.40 | 0.013 |
| $N_2$ Vol % | 88.30 | 93.18 |
| $O_2$ Vol % | 2.30 | 2.30 |
| $CO_2$ Vol % | 5.50 | 1.2 |
| $H_2O$ Vol % | 3.40 | 3.20 |
| $NH_3$ Vol % | 0.10 | 0.10 |

EXAMPLE 2

1.405 parts by weight of a waste gas containing NO and carbon dioxide from the production of ammonium nitrite and having the analytical composition III is brought into contact countercurrently with a sulphuric acid solution IV at a temperature of 65° C.

The oxidized waste gas is absorbed in counter current in 1.501 parts by weight of a 4.5% by weight ammoniacal, aqueous solution to form an ammonium nitrite-containing ammonium carbonate solution V and a purified waste gas. The resulting waste gas contains only 150 ppm of NO.

| Waste Gas III | Sulphuric Acid Solution IV |
|---|---|
| NO: 4.4 parts by weight | $H_2SO_4$: 60.8% by weight |
| $N_2$: 1.214 parts by weight | $HNO_3$: 0.21% by weight |
| $O_2$: 35.2 parts by weight | |
| $CO_2$: 118.8 parts by weight | |
| $H_2O$: 30.8 parts by weight | |
| $NH_3$: 22 parts by weight | |
| Ammonium carbonate Solution V | |
| $(NH_4)_2CO_3$: 10.0% by weight | |
| $NH_4NO_2$: 0.64% by weight | |
| $NH_4NO_3$: 0.09% by weight | |

What is claimed is:

1. A process for the complete recovery of NO from a waste gas of ammonium nitrite production containing carbon dioxide said process consisting essentially of contacting said waste gas containing carbon dioxide with sulphuric acid having a concentration of from 30-70% by weight containing from 0.1 to 5% of nitric acid, in a first stage, absorbing the sulfuric acid containing nitric acid contacted waste gas in a solution of ammonium carbonate and/or ammonium bicarbonate to form an ammonium nitrite solution and, in a second stage, absorbing the resulting waste gas containing carbon dioxide in an ammoniacal, aqueous solution to form ammonium carbonate and/or ammonium bicarbonate and returning said solution to the first stage.

2. A process according to claim 1, wherein the sulphuric acid contains 0.2 to 1.5% by weight of nitric acid.

3. A process according to claim 1, wherein the sulphuric acid is at a temperature of from 25° to 80° C.

4. A process according to claim 1, wherein the sulphuric acid concentration is adjusted by the addition of water and/or nitric acid solution.

5. A process according to claim 1, wherein the sulphuric acid has a concentration of from 55 to 65% by weight.

6. A process according to claim 1, wherein the sulphuric acid is at a temperature of from 50° to 65° C.

* * * * *